March 9, 1926. 1,576,229

A. SEIDEL

LAMINATED COUPLING

Filed Dec. 16, 1924  2 Sheets-Sheet 1

Inventor
A. Seidel
By Marks & Clerk

March 9, 1926.                   1,576,229
A. SEIDEL
LAMINATED COUPLING
Filed Dec. 16, 1924     2 Sheets-Sheet 2

Inventor
A. Seidel
By Marks & Clerk

Patented Mar. 9, 1926.

1,576,229

UNITED STATES PATENT OFFICE.

ARNOLD SEIDEL, OF BERLIN-CHARLOTTENBURG, GERMANY.

LAMINATED COUPLING.

Application filed December 16, 1924. Serial No. 756,306.

*To all whom it may concern:*

Be it known that I, ARNOLD SEIDEL, a citizen of Germany, residing at Berlin-Charlottenburg, Germany, Bismarckstrasse 10, have invented certain new and useful Improvements in Laminated Couplings (for which I have applied for a patent in Germany July 14, 1923), of which the following is a specification.

This invention relates to laminated couplings interposed between the driving member and each driving wheel axle of a power driven vehicle and consists in this that the laminations are arranged so as to be capable of being turned relatively to their supporting member through different angles. This enables a very fine gradation of the frictional force to be made, a coupling for example, which in the first instance acts as a four disc coupling, being capable of developing gradually during a total rotation of about ⅓ of one revolution into a 16 disc coupling or the like.

Several constructional examples of the invention are shown in the accompanying drawings.

Figure 1:
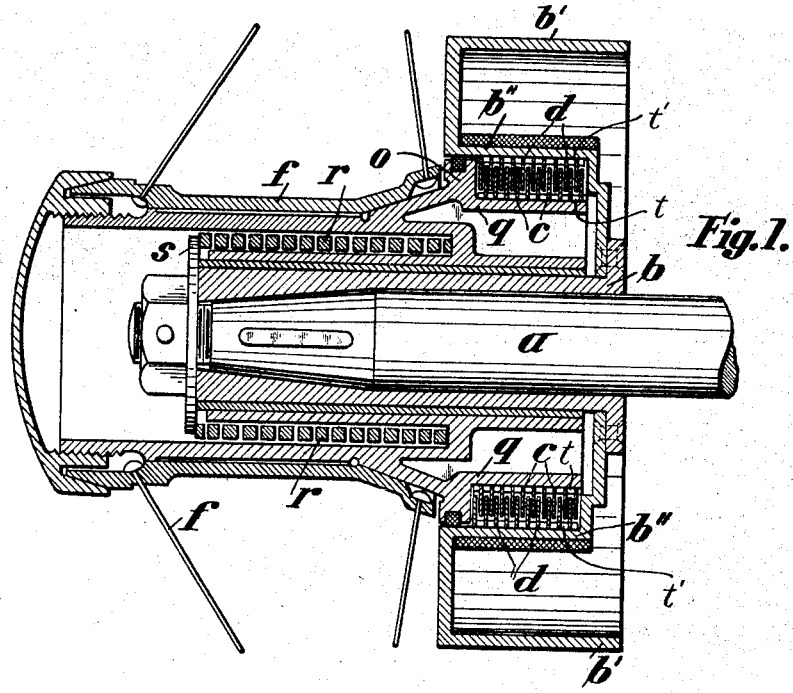

Fig. 1 is a cross-section through a coupling mounted directly on the wheel.

Figure 2:
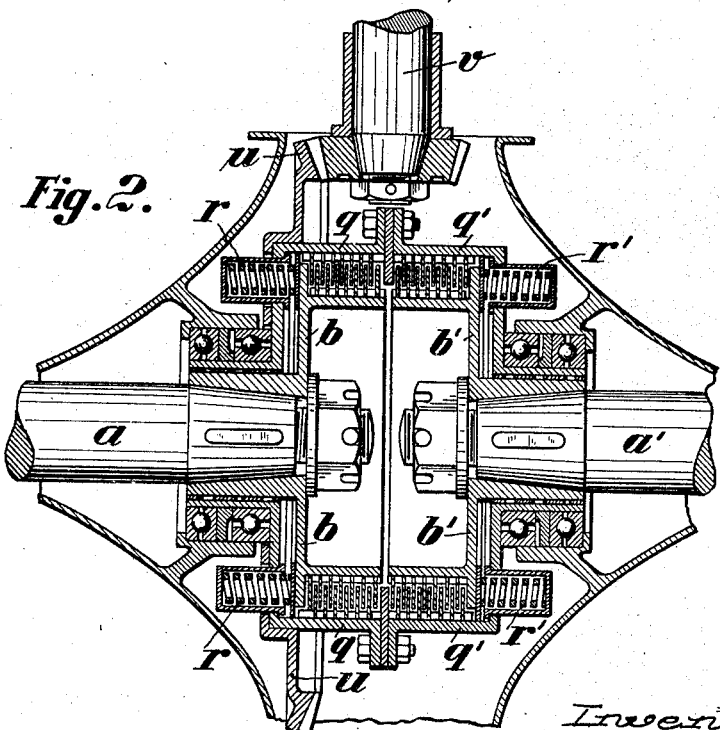

Fig. 2 a section through a coupling device combined with the means for driving the wheels and Figs. 3 to 8 show the arrangement of the laminations.

In the coupling shown in Fig. 1 there is mounted on the shaft $a$ a hub $b$, on which is mounted the brake drum $b'$. On a cylindrical surface $b''$ of the latter there are provided laminations $d$, which engage between the laminations $c$ on the sleeve $q$, which is mounted so as to be rotatable on the hub $b$.

The sleeve $q$ supports the wheel $f$ and is loaded by a spring $r$, which is held by the washer $s$ of the shaft $a$. The sleeve $q$ with the wheel $f$ bears by means of the flange $o$ against the friction coupling, so that lateral thrusts on the wheel can act on the coupling.

Figure 3:
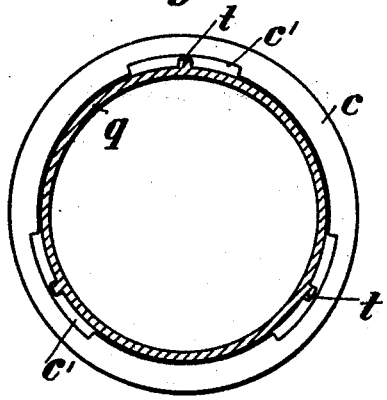
Figure 6:
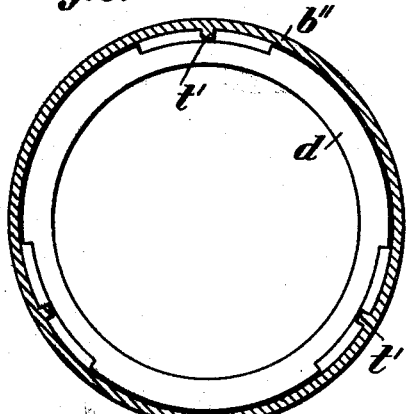
Figure 4:
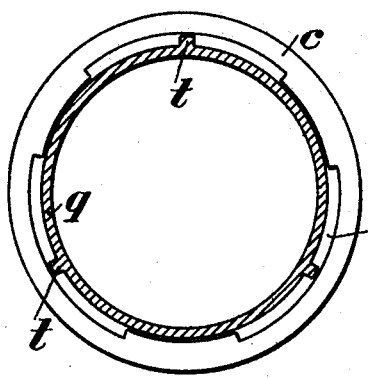
Figure 7:
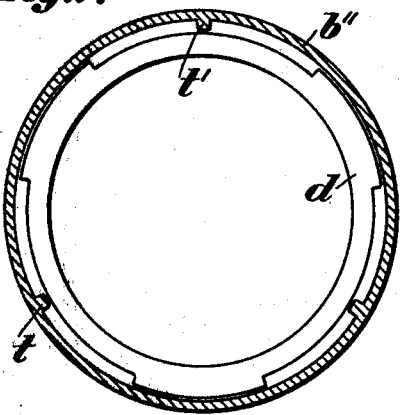
Figure 5:
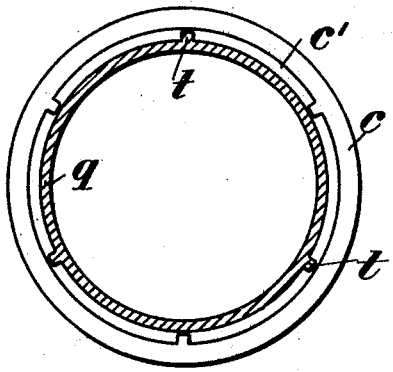
Figure 8:
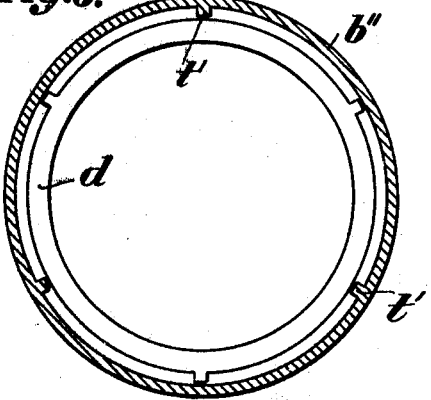

The laminations $c$ are adapted to rest against stop members $t$ of the sleeve $q$ with recesses $c'$, which as is shown in Figs. 3 to 5 increase gradually in size. On these laminations being turned simultaneously, first those having the smallest recesses will engage the stop member $t$ of the sleeve $q$, then those having the next larger recesses $c'$ and finally those having the greatest recesses. The laminations $d$, which are adapted to engage with the stop members $t'$ of the cylindrical part $b''$ of the brake drum, may be similarly formed (cf. Figs. 6 to 8).

With such a construction a friction coupling is obtained, which in the first instance develops only a small frictional force, which however increases considerably with an increasing resistance. As the sleeve $q$ bears against the friction coupling by way of the flange $o$, the lateral thrust on the wheel $f$, according to the direction in which it acts, can increase or decrease the frictional force beyond the amount originally provided by the spring $r$. An increase in the frictional force occurs for instance with the outer wheel, when the vehicle is taking a curve, and a decrease with the inner wheel.

This construction is of special importance in practice, when in taking a curve in the case of the inner wheel some of the laminations having a greater friction are already in action. By reducing the frictional pressure at the inner wheel the driving shaft is again enabled to turn at the speed of the more rapidly rotating outer wheel and thus to distribute the drive evenly to the two wheels (as in the case of the usual differential).

In the constructional form shown in Fig. 2 $a$ and $a'$ are the axles for the rear wheels. On each axle is a hub, $b$ and $b'$ respectively, which supports one set of laminations. Thus this set of laminations is divided, one-half acting in connection with the right-hand wheel and the other half with the left-hand wheel. The opposing laminations are mounted on sleeves $q$ and $q'$, which are rigidly screwed together and are rotatable on the hubs $b$ and $b'$. In this example the said sleeves are screwed to the bevel wheel $u$, which transmits the rotary motion of the shaft $v$ to the wheels. The laminations are pressed against one another by springs $r$ and $r'$. In this case as well the lateral thrust of the wheels is utilized for applying the pressure.

In the constructional form shown in Fig. 2 the laminations also have recesses of different widths, which are adapted to come in contact with stop members of the supporting members. Hence in this case as well there is a gradually increasing frictional force.

What I claim is:—

1. In combination, a driving element, a plurality of driven elements, and a differential driving gear interposed between the driving and driven elements, said differential driving gear including friction couplings provided with notched plates, the notches in the plates of the respective friction couplings varying in length, and stop members carried by the driving and driven elements and engaging in the notches.

2. In combination, a driving element, a plurality of driven elements, and a differential driving gear interposed between the driving and driven elements, said differential driving gear including friction couplings provided with notched plates, the notches in the plates of the respective friction couplings being gradually increased in length progressively from one end of each set of plates to the other, and stop members carried by the driving and driven elements and engaging the notches.

In testimony whereof I have affixed my signature.

ARNOLD SEIDEL.